March 6, 1934. G. PEDRAZZO 1,949,808
ALTERNATING CURRENT MACHINE
Filed June 4, 1929 4 Sheets-Sheet 2
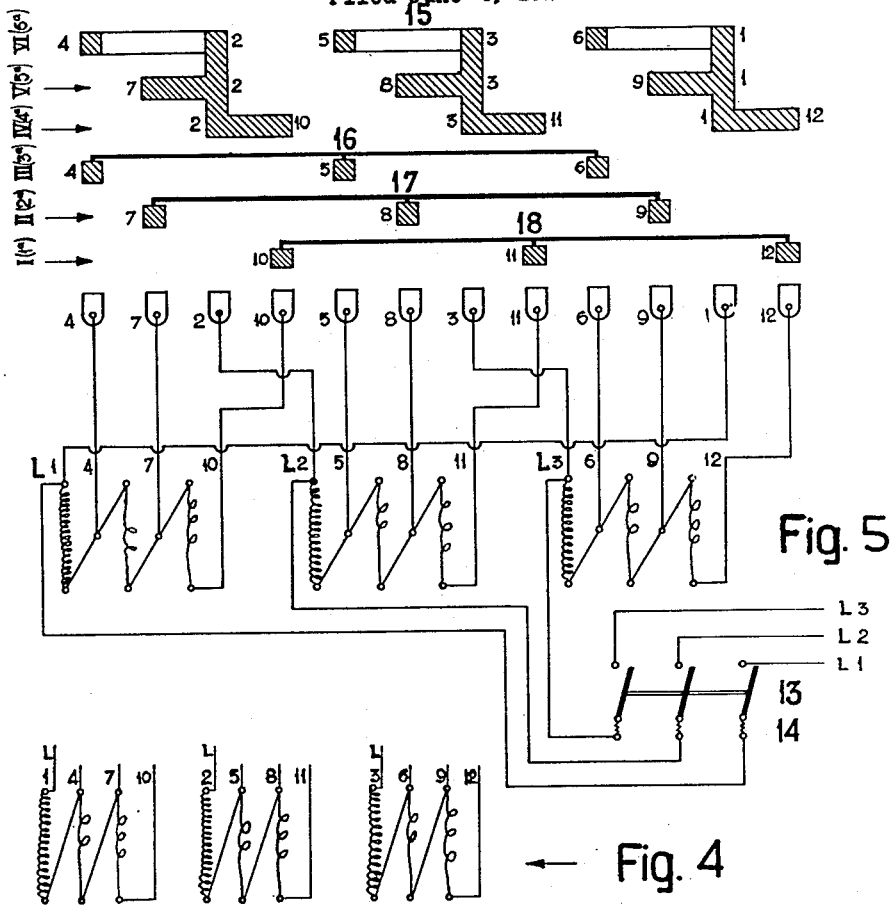
Fig. 5
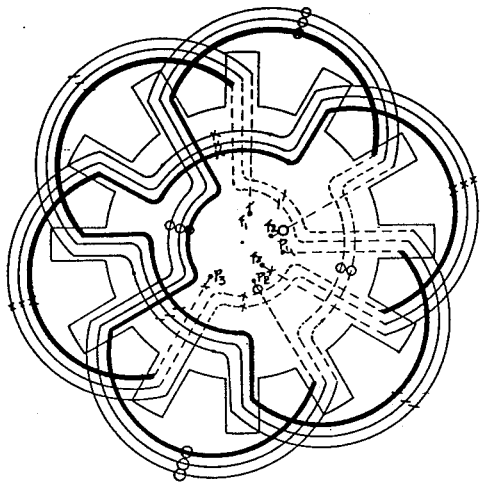
Fig. 4
Fig. 3
Inventor:
Giovanni Pedrazzo,
by E. F. Wundmoth
Att'y.

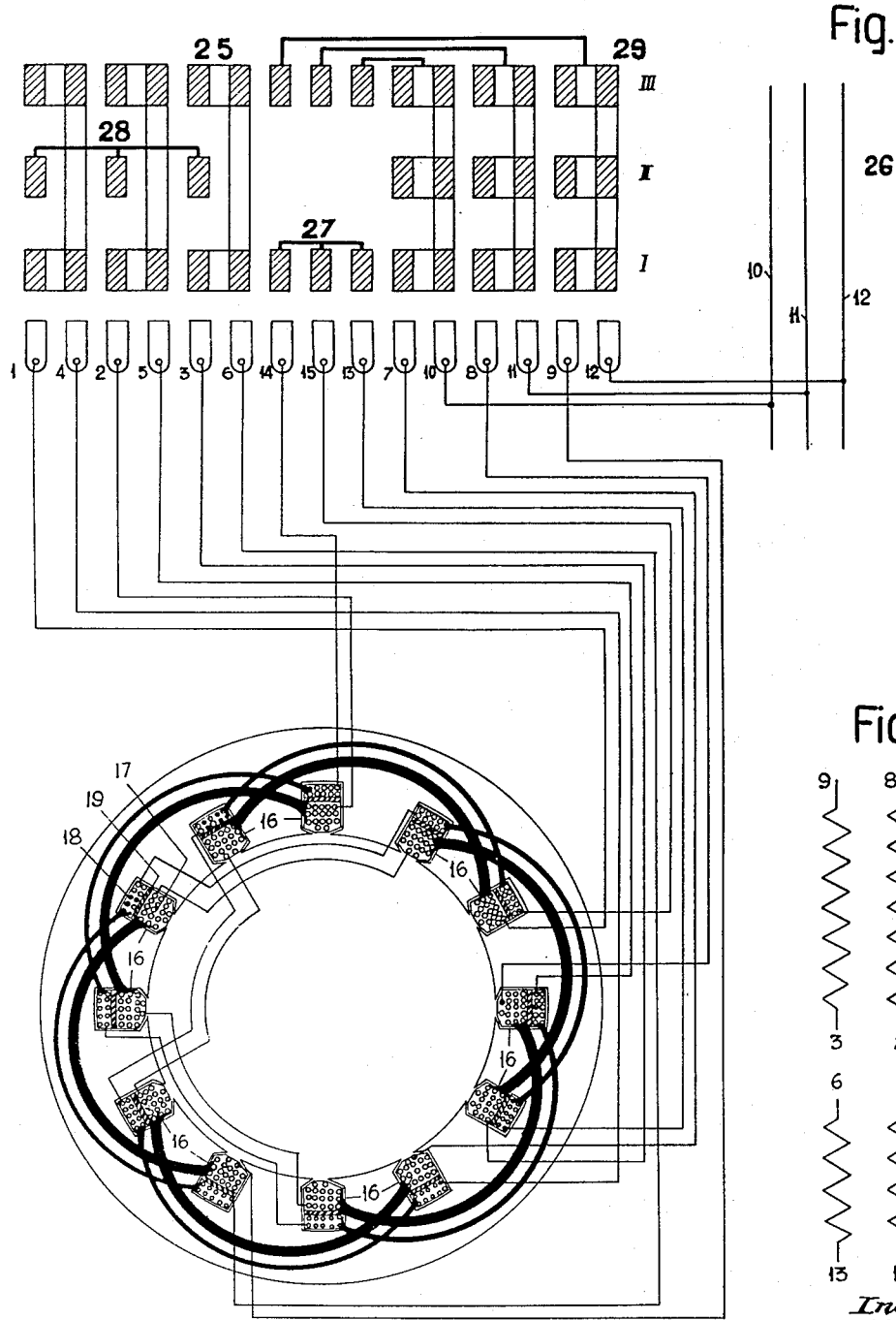

Inventor:
Giovanni Pedrazzo,

March 6, 1934.   G. PEDRAZZO   1,949,808
ALTERNATING CURRENT MACHINE
Filed June 4, 1929   4 Sheets-Sheet 4

Inventor:
Giovanni Pedrazzo,
by E. F. Wunderlich
Atty.

Patented Mar. 6, 1934

1,949,808

UNITED STATES PATENT OFFICE

1,949,808

ALTERNATING CURRENT MACHINE

Giovanni Pedrazzo, Biella, Italy

Application June 4, 1929, Serial No. 368,254
In Italy June 12, 1928

5 Claims. (Cl. 172—120)

It is a known expedient in the case of a three-phase motor, to change the inducing winding from the usual delta connection to the usual star connection, thereby obtaining with the star connection a useful range of power output, with increased efficiency and with increased power factor, for loads ranging from about twenty to thirty-three per cent of the maximum power output of the motor when in delta connection. However, a single range of power output, of such a restricted scope, was not sufficient for practical and economic requirements.

It has already been proposed to obtain ranges of power output in a three-phase motor having two stator windings connected with the supply line in the following ways:—each stator winding was connected either in star or in delta; or one winding was connected in star and the other in delta; and lastly, both windings were connected in what may be called "double star" or "double delta"; that is, the two windings were connected in parallel. It has also been proposed to obtain ranges of power output in an alternating-current motor, by changing, according to the usual or normal power required from the motor, to parallel connection of the windings, or in the case of a three-phase motor, by changing to mixed connections of the windings. But owing to the increase of the additional iron losses and copper losses or to other difficulties, all these proceedings have been found lacking in practical value.

The present invention has for its purpose to adapt alternating-current motors to any number of ranges of power output of arbitrarily chosen values, to render them highly economical on loads below full load, beginning with about, say eighty per cent of the rated maximum power output.

My invention involves the use, for the same purpose, of a novel manner of employing the windings in alternating-current motors, as a result of which it is possible to obtain, simply by a convenient calculation of the windings, particularly in the case of three-phase motors, two motors which while they may differ from each other in certain slight conventional details, are based on the same fundamental inventive principles, these motors being obtained with practical and economical results.

Each of the said alternating-current motors comprises ensembles of inducing windings, preferably one ensemble for each phase, and all the windings of each phase being disposed in the same manner with respect to the inducing magnetic field of the motor. In turn, each of the said ensembles of windings is composed, for each phase, of an inducing main running winding, hereinafter to be referred to as the "main winding", and of one or more inducing minor running windings, hereinafter to be referred to as "minor windings".

In one such motor, a three-phase motor, which embodies my inventive principles, the usual maximum power output of the motor is obtained with all the windings connected in series in each phase, the said ensembles or phases being connected in single delta. To secure the next lower arbitrarily chosen range of power output the ensembles are shifted to single star connection and all of the minor windings of each ensemble are cut out of the circuit of their corresponding principal windings. Successive additional lower ranges of power output are obtained by successively inserting minor running windings in the circuit of their corresponding principal windings until finally, the usual minimum range of power output is obtained when all of the windings of each ensemble are connected in series. The connections of this motor are shown diagrammatically in Fig. 11 of the drawings, to be discussed hereinafter.

In the other possible embodiment of my invention, comprising an alternating-current motor which may have any desired number of phases, the main winding is dimensioned for the usual maximum power output of the motor. For obtaining one or more arbitrarily chosen additional and lower ranges of power output, I employ the main winding in series in each phase with one or more minor windings. In this example of my invention, and in order to obtain one or more ranges of power output, I insert one or more minor windings in the circuit of the current of the main winding in each phase. It is clear that in the case of the three-phase motor, with star-delta connections, further ranges of power output are obtained.

The said purpose is attained because the magnetic flux is kept suitably related to the load, and furthermore because of the absence of parallel connections and of mixed connections of the windings, which were hitherto used in an effort to obtain, in addition to the usual power of the motor, the aforesaid ranges of power output from the motor, since due to such absence the aforesaid additional iron losses and circulating current losses in the copper of the inducing windings of the motor are avoided.

In the said motor the windings of each phase of the motor will preferably be permanently connected in series. These connections, in each phase, between the main winding and the minor winding, (or, if there are more than one minor winding, between the main winding and a minor winding and between the minor windings,) are then provided with taps leading to a connection block adapted for effecting the cutting out, in each phase, of one or more primary inducing minor running windings from the path of the current of the main winding, and for effecting the star or single-star connection, to change to ranges of power output lower than the maximum power output of the motor. Or the connection block is also adapted for inserting, in each phase, one or more inducing minor running windings in the current path of the main winding and, in the case of a three-phase motor, also for effecting the connection in single delta or in single star, when passing successively to lower ranges of power output of the motor.

The cutting out from the circuit, or the insertion in the circuit of minor windings and, in the case of a three-phase motor, also the connection in star or in delta, are preferably made by means of a controller.

I can also conveniently adapt an existing motor to function according to my invention by providing it with an inducing main running winding and one or more inducing minor running windings.

The following description, taken with reference to the accompanying drawings, and given solely by way of example, concerns particularly two three-phase motors, each with an inducing main running winding and one or more inducing minor running windings, but it is to be kept in mind that the invention applies equally well to single-phase motors, two-phase or other polyphase motors.

In these drawings, given by way of example:—

Fig. 1 is a view of a combined motor and controller, with the windings employed according to my invention, the controller being shown in development.

Fig. 2 is a mere representation of the theoretical scheme of the stator windings according to Fig. 1.

Fig. 3 shows diagrammatically a stator according to Fig. 1; however, in Fig. 3, the series connections in each phase between the windings are shown in broken lines.

Fig. 4 is a mere representation of the theoretical scheme of the stator windings according to Fig. 3.

Fig. 5 shows another combined motor and controller, with the windings employed according to my invention (see also Figs. 3 and 4 and Fig. 7), the controller being shown in development.

Figs. 6–10 inclusive show diagrammatically some examples of ensembles of inducing windings employed according to my invention in a three-phase motor.

Figure 11:
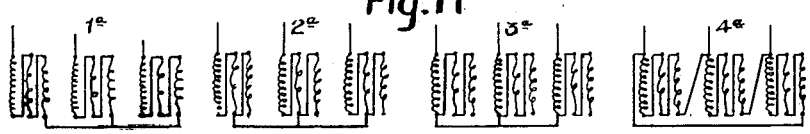

Fig. 11 shows diagrammatically an example of ensembles of inducing windings employed according to my invention in another three-phase motor.

Figs. 12–15 inclusive show diagrammatically, each in cross section, a portion of a stator with either coils or groups of coils.

The windings employed according to my invention can be placed either in the stator or in the rotor, but in either case they are connected to the supply line, and are the inducing windings. Of the said windings the main winding is preferably composed of a larger number of turns, while the minor winding is preferably composed of a smaller number of turns. If there are more than one minor winding, these latter, which may each be of a different number of turns, are designated as follows:—"first inducing minor running winding"; "second inducing minor running winding"; "third inducing minor running winding" etc. Where I have used the term "running" in connection with the windings, this means that the windings concerned are traversed by the working current, in contradistinction to windings traversed only by an exciting current, or by current only during starting.

Referring to Fig. 1, the stator slots are indicated at 16, the three-phase main winding 17 being shown in cross-section in each slot, along with the three-phase minor winding 18. An insulating layer 19 separates the two windings in each slot.

Fig. 1, which is an assembled view, partly diagrammatic and partly structural, also shows a series of cam contact segments I which series relates to a first position of a controller 25; a second series of contact segments II, which series relates to a second position of the said controller; while a third series III of cam contact segments relates to a third position of the controller. Nine contact fingers 1—9 are shown as provided on the controller 25, and are electrically connected with the ends of the three phase windings of the main winding and with the ends of each of the three phase windings of the minor winding. The three contact fingers 10—12 on the controller are connected to the three-phase supply line 26. The thin lines in each group of segments indicate the electrical interconnection of the various cam contact segments. The star connection 27 shown in thick lines at the position I of the controller indicates the electrical connection of the three segments corresponding to the planes of the contact fingers 14, 15 and 13. The star connection 28 shown in thick lines at the position II of the controller indicates the electrical interconnection of the three segments corresponding to the planes of the contact fingers 1, 2 and 3. The three bridge connections 29 shown in thick lines at the position III of the controller indicate: 1. the connection of the contact segments which correspond to the planes of the contact fingers 13, 7 and 10; 2. the interconnection of the contact segments corresponding to the planes of the contact fingers 15, 8 and 11; and 3. the interconnection of the contact segments corresponding to the planes of the contact fingers 14, 9 and 12. The three-phase supply line is shown at 10, 11 and 12.

It will be understood that other schemes of connections to the windings may be devised with the same or similar equipment, and that the connections to the windings may be effected by means of contact bridges or in any other suitable manner whatsoever without departing from the spirit of my invention.

Fig. 2 is a theoretical diagram of the stator windings of Fig. 1, in which diagram the three main phase windings are represented at 1, 7; 2, 8; and 3, 9; the three minor phase windings at 15, 4; 14, 5; and 13, 6. These windings are employed in a three-phase motor to obtain a range of power output according to the invention, in addition to the usual maximum range of power output of the motor and to the usual minimum range of power output of the motor, as follows, reference being had to Figs. 1 and 2.

To obtain the first range of power output corresponding to the lowest degree of intensity of magnetization in the iron of the motor; with the position I of the controller the main winding in each phase is connected in series with the corresponding minor winding by connecting the ends 1 and 4, 2 and 5, and 3 and 6, the two windings (main and minor) are connected in a single star with the ends 15, 14 and 13 of the minor winding joined; and the three-phase supply wires 10, 11 and 12 are connected to the ends 7, 8 and 9 of the main winding. To obtain the second range of power output corresponding to the second degree of intensity of magnetization in the iron of the motor; with the position II of the controller, only the main winding is connected in star, with the ends 1, 2 and 3 joined, and by joining the three-phase supply wires 10, 11 and 12 to the ends 7, 8 and 9 of the main winding; and with this range of power output, which is obtained according to my invention, the minor winding, composed of the three phase windings 4, 15; 5, 14; and 6, 13; is cut out of the primary circuit of the motor, and the series connections, in each phase, between the main winding and the minor winding are interrupted. To obtain the usual rated maximum range of power output of the motor corresponding to the maximum degree of intensity of magnetization in the iron of the motor; with the position III of the controller the main winding in each phase is connected in series with the corresponding minor winding by connecting the ends 1 and 4, 2 and 5 and 3 and 6; and the three ensembles (each composed of a main winding and a minor winding) are connected in a single delta; with this connection, the supply line 10 is connected to the end 7 of the main winding and to the end 13 of the minor winding; the supply line 11 is connected to the end 8 of the main winding and to the end 15 of the minor winding; and the supply line 12 is connected to the end 9 of the main winding and to the end 14 of the minor winding.

Fig. 3 shows diagrammatically an example of a stator similar to the stator of Fig. 1; in Fig. 3, however, I have shown a three-phase main winding and two three-phase minor windings, the series connections in each phase between the main winding and the minor winding, and between the minor windings, being indicated in broken lines. As already stated, these connections may be permanent (as shown in the figure) and each connection may be provided with a tap leading to a device adapted to effect, in each phase of the ensemble of the inducing windings of the motor, either the insertion of the minor windings in the current path of the main winding or the removal of the minor windings from the current path of the main winding of the motor, and in each case the connection of the ensembles either in star or in delta, according to Fig. 7 or Fig. 11.

Referring to Fig. 5 which is a combined view (and referring also to Figs. 3, 4 and 7), this figure shows that with the ensembles of windings employed according to my invention, a motor is obtained which differs from the motor obtained according to Figs. 1 and 2.

According to Fig. 5:—The maximum usual power output of the motor is obtained with connections according to the position VI (6a) of the controller, with only the main three-phase winding, delta connected; the three-phase lines L1, L2 and L3 are respectively connected, through the switch 13 and the fuses 14, to the main winding of each phase, L1, L2 and L3, and the main winding is connected in delta by the controller segments 15 (4—2, 5—3 and 6—1), this being accomplished by means of the end L2 and tap 4; the end L3 and tap 5; and the end L1 and tap 6, the said ends and taps being connected to the contact fingers 4, 2, 5, 3, 6 and 1 of the controller. And with connections according to the position III (3a) of the controller is obtained the usual minimum range of power output of the motor, with only the main winding star connected by the controller segments 4, 5 and 6, which are electrically connected by the conductor 16, the main winding being star connected by means of the taps 4, 5 and 6 which are electrically connected to the contact fingers 4, 5 and 6 of the controller.

Four differing ranges of power output of the motor are obtained with the positions V (5a), IV (4a), II (2a), and I (1a) of the controller, by employing the windings according to the invention.

In the position V (5a) of the controller, the segments 7—2, 8—3 and 9—1 connect, in single delta, the main three-phase winding (L1—4, L2—5 and L3—6) and the first minor three-phase winding (4—7, 5—8 and 6—9), which windings are permanently connected in series in each phase, by means of: the end L2 and the tap 7; the end L3 and the tap 8; and the end L1 and the tap 9, ends and taps which are electrically connected to the contact fingers 7, 2, 8, 3, 9 and 1 of the controller. With this position V (5a) a range of power output of the motor is obtained for operation between about 50 and 85 per cent of the usual maximum power output of the motor.

In the position IV (4a) of the controller, the segments 2—10, 3—11 and 1—12 connect, in single delta, the main three-phase winding and the two minor three-phase windings (these windings being permanently connected in series in each phase) by means of: ends L2 and 10; ends L3 and 11; and ends L1 and 12, which are respectively ends of the main winding of each phase (L1, L2 and L3) and of the second minor winding of each phase (10, 11 and 12), which ends are electrically connected to the contact fingers 2, 10, 3, 11, 1 and 12 of the controller. With this position IV (4a) there is obtained a range of power output of the motor for operation between about 25 per cent and 65 per cent of the usual maximum power output of the motor.

In the position II (2a) of the controller, the controller segments 7, 8 and 9, electrically connected to the conductor 17, connect, in single star, the main winding and the first minor winding, by means of the taps 7, 8 and 9, connected to the contact fingers 7, 8 and 9 of the controller. With this position II (2a) there is obtained a range of power output of the motor for operation between about 11 per cent and 25 per cent of the usual maximum power output of the motor.

And lastly, in the position I (1a) of the controller, the controller segments 10, 11 and 12, electrically connected to the conductor 18, connect, in single star, the main winding and the two (the first and the second) minor windings, by means of the ends 10, 11 and 12 which are electrically connected to the contact fingers 10, 11 and 12 of the controller. With this position I (1a) there is obtained a range of power output of the motor for operation between about 5 per cent and 20 per cent of the usual maximum power output of the motor.

In the theoretical diagrams of Figs. 6–11 inclusive, the main winding is shown on the left in each phase of each detail of these diagrams, and the minor winding is shown on the right; or (in the case of more minor windings) the minor windings are shown successively on the right. Where, in the details of the said diagrams, no connections are shown, this is intended to indicate, in each phase, the cutting out of the minor winding or windings from the circuit of the current of the main winding, and the interruption of the series connections between the main winding and the minor winding, or between the main winding and the adjacent minor winding and between the several successive minor windings. The connection of the main winding in star or in delta, or of the windings in a single star or in a single delta, is shown in full lines in the details of the said diagrams.

For example:—

Figure 6:
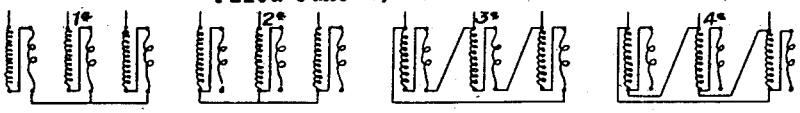
Figure 7:
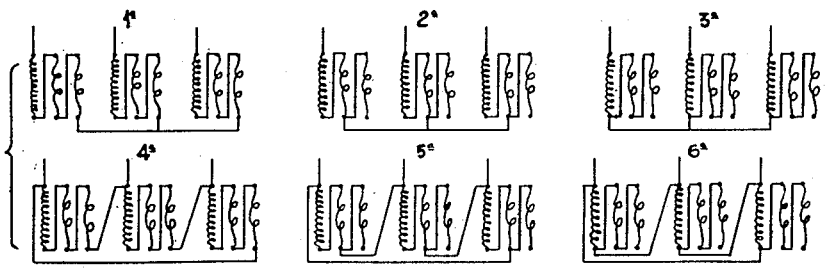
Figure 8:
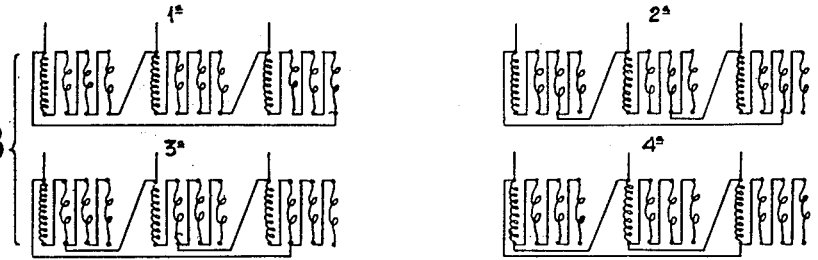
Figure 9:
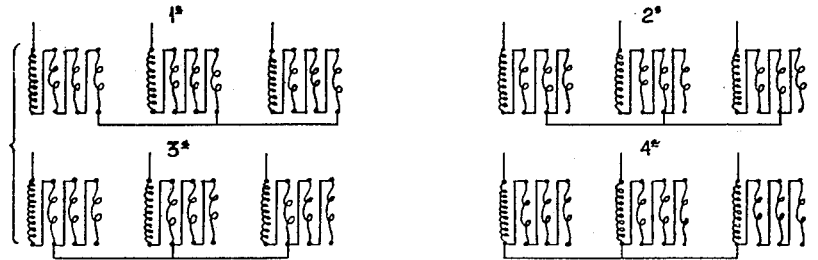
Figure 10:
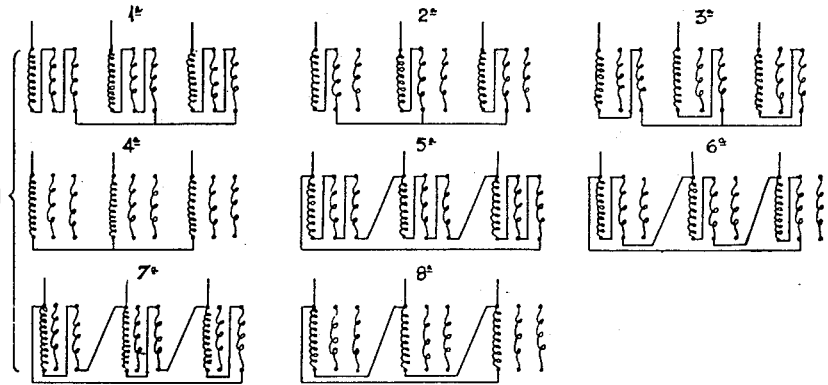

According to Fig. 6, in a three-phase motor the main winding and the minor winding are connected as is shown at 1ª, 2ª, 3ª, and 4ª in order to obtain three different ranges of power output from the motor in addition to the usual maximum range of power output corresponding to connection 4ª;

According to Fig. 7, in a three-phase motor the main winding and the two minor windings are connected as is shown at 1ª, 2ª, 3ª, 4ª, 5ª and 6ª in order to obtain five different ranges of power output from the motor in addition to its usual maximum range of power output corresponding to connection 6ª;

According to each of Figs. 8 and 9, in a three-phase motor the main winding and the three minor windings are connected as is shown at 1ª, 2ª, 3ª and 4ª in order to obtain three different ranges of power output from the motor in addition to its usual maximum range of power output corresponding to connection 4ª;

According to Fig. 10, in a three-phase motor the main winding and the two minor windings are connected as is shown at 1ª, 2ª, 3ª, 4ª, 5ª, 6ª, 7ª and 8ª in order to obtain seven different ranges of power output from the motor in addition to its usual maximum range of power output corresponding to connection 8ª;

According to Fig. 11, in a three-phase motor the main winding and the two minor windings are connected as is shown at 1ª, 2ª, 3ª and 4ª in order to obtain three different ranges of power output from the motor in addition to its usual maximum range of power output corresponding to connection 4ª.

Figure 12:
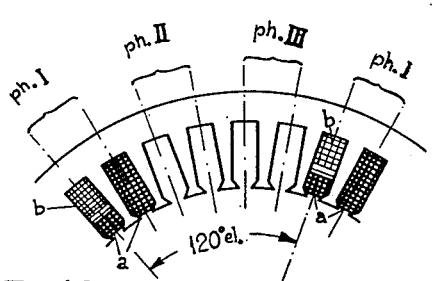
Figure 13:
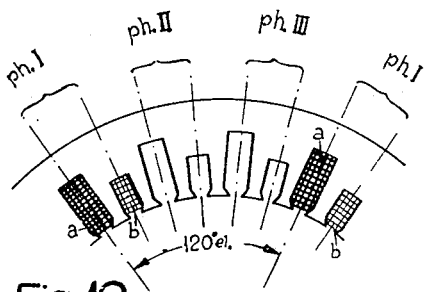

Figs. 12 and 13 show two examples of three-phase mesh windings employed according to the invention; in each figure there is shown diagrammatically a portion of a stator with eight slots, whereby 1. In Fig. 12, phI, phII, phIII, and phI (as shown in the drawings) each represents the slots relating to a pole. Two coils of a main winding are shown in cross section at $a$, $a$, while a coil $b$, $b$ of a minor winding is also shown in cross section. As the drawings show, the main winding for each pole of each phase is wound through two slots and through two portions of slots. The minor winding for each pole of each phase is wound through two portions of slots; and 2. Fig. 13 is an analogous diagram, but in this example the main winding for each pole of each phase is represented as wound through two large slots, and the minor winding for each pole of each phase is represented as wound through two small slots.

Figure 14:
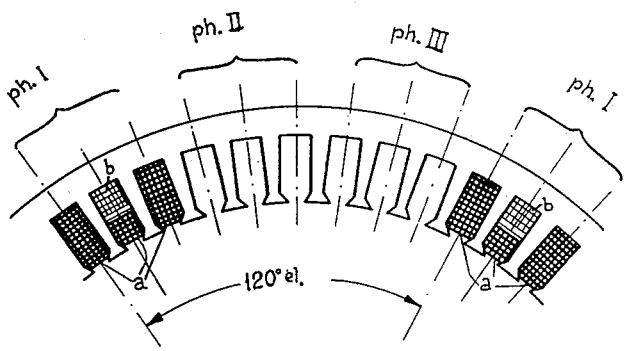
Figure 15:
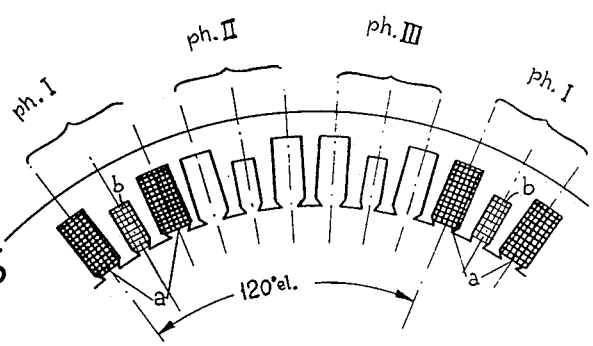

Figs. 14 and 15 represent two examples of three-phase two-plane windings to be employed according to this invention; in each figure there is shown diagrammatically a portion of a stator having twelve slots, whereby 1. In Fig. 14, phI, phII, phIII and phI (as shown in the drawings) each represents the slots relating to a pair of poles of each phase, and adapted to receive a group of coils of a main winding shown at $a$, $a$ in cross section, while at $b$, $b$ there is shown a coil of a minor winding in cross section. It is evident that the main winding for each group of coils of each phase is wound through four slots and through two portions of slots. The minor winding for each group of coils of each phase is wound through two portions of slots;

Fig. 15 is a view similar to Fig. 14, but in this example the main winding $a$—$a$ for each pair of poles of each phase is represented as wound through four large slots, and the minor winding $b$—$b$ is shown as wound through two small slots.

As suggested previously, my invention is applicable to alternating-current motors of any type whatsoever with any number of poles and with inducing windings wound in any number of slots. The type of winding to be used as an example for forming or constructing a series of inducing windings in a motor to be employed according to my invention may be of any conventional form known to the art, it being understood that all the windings for each phase must be disposed in the same manner with respect to the inducing magnetic field of the motor.

Two numerical examples of calculation for two differing three-phase motors will now be explained. In both examples the line voltage is assumed to be 500 volts.

*Example 1.*—For a three-phase motor, in which the windings are intended to be connected as represented in Fig. 7 (which refers to the insertion, in each phase of the ensemble of inducing windings of a three-phase motor, of one or two minor windings into the path of the current of the main winding in order to obtain four different ranges of power output 1ª, 2ª, 4ª and 5ª); the main winding, composed of three phase windings, is calculated, with star connection and normal intensity of magnetization, for a voltage of 865 volts; the first minor winding, composed of three phase windings, is calculated, with star connection and normal intensity of magnetization, for a voltage of 173 volts; the second minor winding, composed of three phase windings, is calculated, with star connection and normal intensity of magnetization, for a voltage of 216 volts. The four different ranges of power output in the motor and the two usual rated power outputs of the motor for either star or delta connection, represented in Fig. 7, are obtained as follows: 1. By the application of the line voltage (500 volts) at 1ª to the main winding and to both minor windings, all of them connected in series with each other in each phase, calculated for a total of 1254 volts on the basis of normal intensity of magnetization, with connection of the three phases in a single star; 2. By the application of the line voltage (500 volts) at 2ª to the main winding and to the first minor winding, connected in series with each other in each phase, calculated for a total of 1038 volts on the basis of normal intensity of magnetization with connection of the three phases in a single star; 3. By the application of the line voltage (500 volts) at 3ª to the main winding alone calculated for 865 volts on the basis of normal intensity of magnetization, with the usual star connection of the three phases, for the usual range of power output for star connection; 4. By the application of the line voltage (500 volts) at 4ᵃ to the main winding and to both minor windings, all of them connected in series with each other in each phase, calculated for a total of 725 volts on the basis of normal intensity of magnetization with connection of the three phases in a single delta; 5. By the application of the line voltage (500 volts) at 5ᵃ to the main winding and to the first minor winding, connected in series with each other in each phase, calculated for a total of 600 volts on the basis of normal intensity of magnetization, with connection of the three phases in a single delta.; 6. By the application of the line voltage (500 volts) at 6ᵃ to the main winding alone calculated for 500 volts on the basis of normal intensity of magnetization with the usual delta connection of the three phases for the usual maximum range of power ouput of the motor in delta connection. The line voltage being 500 volts, the intensity of magnetization in this last case will have the value assumed as normal in the above calculations.

Assuming that this motor is constructed for 100 H. P. as rated power, or maximum power output of the motor on full load, the four different ranges of power output of the motor, with sustained efficiency and with sustained power factor on each range, as well as the said two normal power outputs of the motor, are obtained as follows: The first range of power output (1ᵃ) for mechanical loads from 5 H. P. to 20 H. P.; the second range of power output (2ᵃ) for loads from 11 H. P. to 25 H. P.; the third range of power output (3ᵃ), which is the normal output for star connection, for loads from 20 H. P. to 33 H. P.; the fourth range of power output (4ᵃ) for loads from 25 H. P. to 65 H. P.; the fifth range of power output (5ᵃ) for loads from 50 H. P. to 85 H. P.; and the usual maximum range of power output (6ᵃ) with delta connection for loads from 75 H. P. to 100 H. P.

The limiting values of power output given in the preceding examples are based on actual tests with windings employed according to my invention in a three phase motor, and are given as typical.

*Example 2.*—For a three-phase motor, in which the detailed arrangement of the ensembles of inducing windings of the motor is shown in Fig. 11 (which refers to the removal, from each phase, of one or of two minor windings from the current circuit of the principal winding, after making the known change-over from delta to star, in order to obtain from a three-phase motor two different ranges of power output 2ᵃ and 3ᵃ) the main winding, composed of three phase windings, is calculated, with star connection, for a voltage of 580 volts on the basis of normal intensity of magnetization; the first minor winding, composed of three phase windings, is calculated, with star connection, for a voltage of 120 volts on the basis of normal intensity of magnetization; the second minor winding, composed of three phase windings, is calculated, with star connection, for a voltage of 165 volts on the basis of normal intensity of magnetization. The three different ranges of power output from the motor in star connection as well as the power output of the motor for the delta connection represented in Fig. 11 are obtained as follows: 1. By the application of the line voltage (500 volts) at 1ᵃ to the main winding and to both minor windings, all of them connected in series with each other in each phase, calculated for a total of 865 volts on the basis of normal intensity of magnetization, with connection in a single star; 2. By the application of the line voltage (500 volts) at 2ᵃ to the main winding and to the first minor winding, connected in series with each other in each phase, calculated for a total of 700 volts on the basis of normal intensity of magnetization, with connection in a single star; 3. By the application of the line voltage (500 volts) at 3ᵃ to the main winding alone calculated for 580 volts on the basis of normal intensity of magnetization, with star connection; 4. By the application of the line voltage (500 volts) at 4ᵃ to the main winding and to both minor windings, all of them connected in series with each other in each phase, calculated for a total of 500 volts on the basis of normal intensity of magnetization, with connection in a single delta. This Case 4 being the condition for the usual maximum range of power output of the motor, the line voltage of 500 volts will correspond to the maximum intensity of magnetization in the iron. For the three preceding Cases 3, 2 and 1, the intensity of magnetization is successively lower.

Assuming that this motor is constructed for 100 H.P., which is the rated full load output of the motor, the three lower ranges of power output, with both efficiency and power factor at each of said ranges increased as compared with those obtained by the use of windings in a three-phase motor according to the prior art, as well as the usual power output of the motor, are obtained as follows:—The first (known) range of power output (1ᵃ) for loads from 20 H. P. to 33 H. P.; the second range of power output (2ᵃ) for loads from 25 H. P. to 60 H. P.; the third range of power output (3ᵃ) for loads from 50 H. P. to 80 H. P.; and the usual maximum range of power output (4ᵃ) for loads from 75 H. P. to 100 H. P. As stated previously, these limiting values are merely typical.

I claim:

1. In an alternating-current motor of any number of phases, means for producing values of magnetic flux, each best adapted to a particular range of power output of the motor, for a number of different arbitrarily chosen ranges of power of the motor, and for maintaining the power factor and efficiency approximately constant over said ranges during the operation of the motor, said means comprising an ensemble of windings for each phase, all of the windings of each ensemble, for each phase, being disposed in the same manner with respect to the inducing magnetic field of the motor, each of said ensembles of windings comprising a principal running winding and at least one minor running winding, a connection block to which all the ends of all the windings of all the ensembles are connected, the connection block being such that the number of minor running windings, in each ensemble, in the current circuit of the principal running winding, may be changed, for the purpose of obtaining, besides the usual range of power, further or additional arbitrarily chosen ranges of power of the motor.

2. In a three-phase alternating-current motor, means for producing values of magnetic flux, each best adapted to a particular range of power output of the motor, for a number of different arbitrarily chosen ranges of power of the motor, and for maintaining the power factor and efficiency approximately constant over said ranges during the operation of the motor, said means comprising an ensemble of windings for each phase, all of the windings of each ensemble, for each phase, being disposed in the same manner with respect to the inducing magnetic field of the motor, in which motor each of said ensembles of windings comprises a principal running winding and at least one minor running winding, a connection block to which all the ends of all the windings of each ensemble are connected, the connection block being such that at least one minor winding of each phase may be cut out of the current circuit of each principal winding, for the purpose of obtaining, besides the usual ranges of power, further or additional arbitrarily chosen ranges of power of the motor.

3. In a three-phase alternating-current motor, means for producing values of magnetic flux, each best adapted to a particular range of power output of the motor, for a number of different arbitrarily chosen ranges of power of the motor, and for maintaining the power factor and efficiency approximately constant over said ranges during the operation of the motor, said means comprising an ensemble of windings for each phase, all of the windings of each ensemble, for each phase, being disposed in the same manner with respect to the inducing magnetic field of the motor, all of the windings of each ensemble being permanently connected together in series with each other at junction points, in which motor each of said ensembles of windings comprises a principal running winding and at least one minor running winding, tap wires connected to said junction points, a connection block to which the ends of the windings and said tap wires are connected, said connection block being such that at least one minor winding of each phase may be cut out of the path of current of each principal winding, for the purpose of obtaining, besides the usual ranges of power, further or additional arbitrarily chosen ranges of power of the motor.

4. In an alternating-current motor of any number of phases, means for producing values of magnetic flux, each best adapted to a particular range of power output of the motor, for a number of different arbitrarily chosen ranges of power of the motor, and for maintaining the power factor and efficiency approximately constant over said ranges during the operation of the motor, said means comprising an ensemble of windings for each phase, all of the windings of each ensemble, for each phase, being disposed in the same manner with respect to the inducing magnetic field of the motor, in which motor each of said ensembles of windings comprises a principal running winding dimensioned for the usual maximum power of the motor and at least one minor running winding, a connection block to which all the ends of all the windings of each ensemble are connected, the connection block being such that at least one minor winding of each phase may be inserted into the current circuit of each principal winding, for the purpose of obtaining, besides the usual ranges of power, further or additional arbitrarily chosen ranges of power of the motor.

5. In an alternating-current motor of any number of phases, means for producing values of magnetic flux, each best adapted to a particular range of power output of the motor, for a number of different arbitrarily chosen ranges of power of the motor, and for maintaining the power factor and efficiency approximately constant over said ranges during the operation of the motor, said means comprising an ensemble of windings for each phase, all of the windings of each ensemble, for each phase, being disposed in the same manner with respect to the inducing magnetic field of the motor, all of the windings of each ensemble being permanently connected together in series with each other at junction points, in which motor each of said ensembles of windings comprises a principal running winding dimensioned for the usual maximum power of the motor and at least one minor running winding, tap wires connected to said junction points, a connection block to which the ends of the windings and said tap wires are connected, said connection block being such that at least one minor winding of each phase may be inserted into the path of the current of each principal winding, for the purpose of obtaining, besides the usual ranges of power, further or additional arbitrarily chosen ranges of power of the motor.

GIOVANNI PEDRAZZO.